Figure 1:
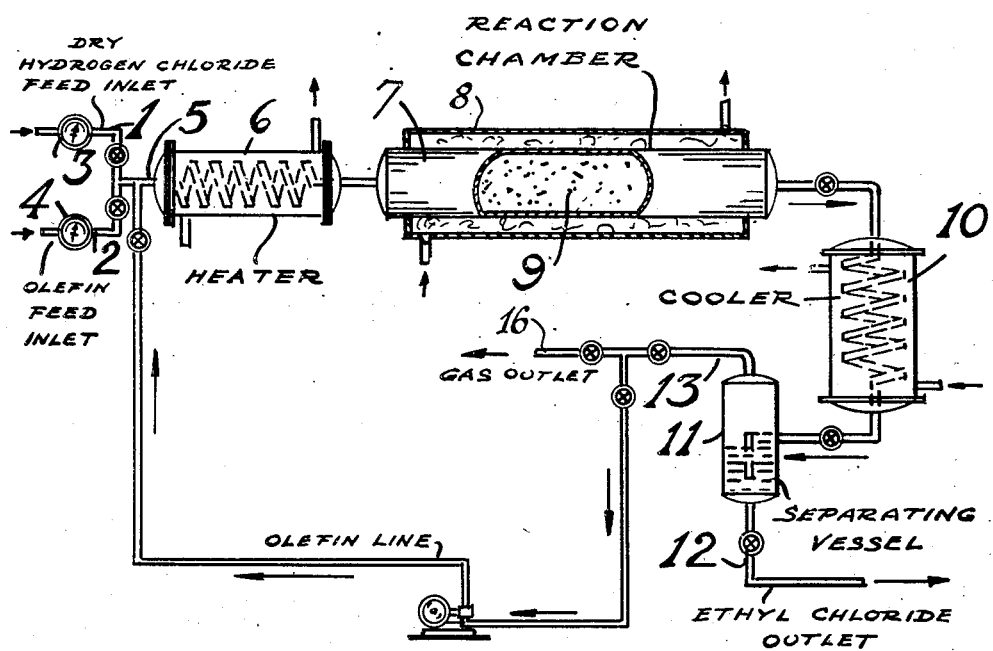

Dec. 24, 1940.  O. C. SLOTTERBECK  2,225,933
METHOD FOR PRODUCING ALKYL HALIDES BY REACTION OF
OLEFINS WITH HYDROGEN HALIDES
Filed Aug. 26, 1937  2 Sheets-Sheet 1

Ober C. Slotterbeck Inventor
By _____ Attorney

Dec. 24, 1940.  O. C. SLOTTERBECK  2,225,933
METHOD FOR PRODUCING ALKYL HALIDES BY REACTION OF
OLEFINS WITH HYDROGEN HALIDES
Filed Aug. 26, 1937  2 Sheets-Sheet 2

Fig. 2

Ober C. Slotterbeck Inventor
By P. L. Young Attorney

Patented Dec. 24, 1940

2,225,933

UNITED STATES PATENT OFFICE 2,225,933

METHOD FOR PRODUCING ALKYL HALIDES BY REACTION OF OLEFINS WITH HYDROGEN HALIDES

Ober C. Slotterbeck, Elizabeth, N. J., assignor to Standard Oil Development Company, a corporation of Delaware Application August 26, 1937, Serial No. 161,006

10 Claims. (Cl. 260—663)

The present invention relates to an improved process for producing alkyl halides by reaction of olefins with hydrogen halides, more specifically to a method for conducting the reaction, and a catalyst of especial value in connection with this method. The invention will be fully understood from the following description.

In Fig. I of the drawings there is a diagrammatic view in sectional elevation of an apparatus for conducting the reaction in vapor phase and likewise indicates the flow of the various materials and Fig. II is a similar view of an apparatus adjusted to effect the reaction in liquid phase.

Alkyl halides are known to be formed by the reaction of olefins, for example ethylene or propylene, or of the higher olefins, with hydrogen halides such as hydrochloric, hydriodic or hydrobromic acids. One of the difficulties of the reaction is the fact that the catalysts used not only promote the formation of the alkyl halide but likewise cause a considerable production of polymerized olefins, particularly under the conditions which are most attractive for the production of the said alkyl halides. This is objectionable not only from the point of view of loss of the raw material, but also because of the fact that the presence of the polymer causes a rapid deterioration of the catalyst.

It has now been found that certain mixed catalysts while very active for the desired reaction leading to the production of alkyl halides possess polymerizing qualities to only a very small extent and that the alkylation may be conducted conveniently above room temperature by this means so that the refrigeration is not required. The use of these catalysts leads to larger ultimate yields, long life of catalyst and lower production costs. The nature of the catalyst and the method will be disclosed very fully below.

Turning to the drawings, in Fig. I line 1 represents a feed line through which a dry hydrogen chloride is passed and line 2 represents the feed line through which the olefin enters. It will be recognized that various reactants may be used as indicated above, but since the ethyl chloride is the commonest and most useful of the alkyl chlorides, the method of manufacturing this material will be specifically referred to in the following description. 3 and 4 represent meters for measuring or regulating the flow of the reactants which meet in line 5 and then pass through a heater 6 or directly into a heated reaction chamber 7. This may be in any convenient form, for example in the form of a tube surrounded by a heat regulating jacket 8. The tube may be in a horizontal position as shown or in a vertical position and is filled with the catalyst indicated generally at 9. This may be in powdered or in lump form with or without a carrier as desired. The effluent gases pass from the reactor to a cooler 10 into a separating vessel 11 from which the condensed ethyl chloride is removed by line 12. The uncondensed gases are removed by line 13. If the olefin used is substantially pure, there may be a considerable amount of olefin left unreacted and this may be recirculated by means of a line 14 and a pump 15, if desired. However, the conditions may be arranged so as to substantially completely react the olefin and this is especially desirable in cases where dilute gases are used so that no recirculation is required. These may be then removed by a pipe 16.

While the apparatus shown above is satisfactory and brings about reaction of the olefin and the alkyl halide in vapor phase, it is also possible to carry out the reaction in liquid phase and such an operation is illustrated in Fig. II. Just as before, the hydrogen chloride and the ethylene enter by pipes 1 and 2, pass through meters 3 and 4 respectively and then combine in a pipe 5 leading to a heater 6. The reaction vessel in this case may be in the form of an upright tube 7 adapted to contain the catalyst in liquid form. The reactor may be simply a tank or it may be provided with bubble caps or other devices to effect a more efficient contact of liquid with the gaseous reactants. The catalyst is made up in a tank 8 and is fed by a pump 9 through a pipe 10 into the reaction vessel and it may enter either at the bottom by a pipe 10a or, alternatively, at the top by the pipe indicated by the dotted lines 10b. In any case, the reacting gases preferably enter the reaction chamber by a pipe 11 at the lower portion of the reactor 2. Unreacted gases are removed from the top of the reaction tube into a condenser 12 at a temperature 20 to 30° C. to reflux the solvent and preferably pass through a condenser 13 to a separating chamber 14 from which any condensed ethyl chloride which may have been carried by the gases, is dropped out and withdrawn by pipe 15. The dry gases then pass by a pipe 16. As before, they may be recirculated by the pipe 17 and a pump 18, but conditions may ordinarily be adjusted so as to substantially completely consume the olefin in a single passage.

Returning to the reaction chamber, the catalytic liquid is removed and passed into a still 20. If the catalyst enters at the lower end of the reactor 7, as by pipe 10a, then it is preferable to remove the catalytic liquor from the top by pipe 19a while, on the other hand, if the catalyst enters the reactor 7 at the top by 10b, then it is preferable to remove the catalytic liquor by a pipe 19b. In any case, it is discharged into the still 20, as stated before, and ethyl chloride is removed as a vapor through pipe 21 and is condensed in the worm 22 and removed to storage by pipe 23. A single still is shown on the drawing but this may be replaced by a more efficient column still, if desired. The product separated from the gases may be combined with the product in pipe 23. The catalytic liquor, from which the ethyl chloride has been substantially completely distilled, is withdrawn from still 20 by a pipe 24 and is forced by a pump 25 back into the reaction chamber either by a pipe 26a joining with 10a or 26b joining with 10b. It will be understood that since the catalyst deteriorates in time it may be withdrawn from the pipe 27 after a considerable interval, or a portion may be withdrawn continuously or at intervals and replaced by fresh catalyst.

In the present process the catalyst consists of a mixture of anhydrous halides. One of these is selected from the group of aluminum or zinc halides, preferably the chlorides, and the other constituent consists of ferric chloride or some other ferric halide. The catalyst is best made by mixing aluminum chloride or zinc chloride, as the case may be, with ferric chloride by grinding together cold or by heating the materials together so as to cause a complete mixing. While it is preferred to use iron chloride, it will be understood that any iron salt may be used which under the conditions of operation will yield an iron chloride; for example, salts of iron can be used in place of the chloride such as ferric acetate, carbonate and the like. While the catalyst is believed to be a mechanical mixture of the two chlorides mentioned, it is not perfectly clear that the material is not a chemical combination of two chlorides or perhaps a chemical combination in which an organic radical also takes part. The ratio of the two constituents of the catalyst may vary considerably. If too much of the aluminum or zinc be present, there will be a needlessly large proportion of polymer produced and it is believed that the best mixture consists of equal molal portions of the two chlorides, iron and aluminum or iron and zinc as the case may be.

The catalyst may be used in lump or powdered form as indicated before and may be spread on suitable carriers such as silica, carborundum, asbestos, active carbon or alumina, when the reaction is carried out in vapor phase. The temperatures used may vary considerably, say in a broad range from 20° to 150° C., but the reaction occurs quite smoothly and rapidly at temperatures of about 80 to 100° C., at which large yields of substantially polymer free product are obtained. Similarly, the reaction may be carried out at normal atmospheric pressure or at reduced pressures or, on the other hand, at pressures considerably above atmospheric. The mixed catalysts are found to be substantially as active as ordinary aluminum chloride for the production of alkyl halides, and at temperatures above room temperature where aluminum chloride gives rise to a considerable amount of polymer, it has been found that the mixed catalyst will produce little or no polymer.

It has been found preferable to operate the present process in liquid phase; that is to say while maintaining the catalyst in liquid phase, the gases are bubbled through to bring about the reaction. The preferred liquids are, of course, those in which the catalytic materials are soluble. Ethyl chloride or other ethyl halides may be used but they are not such good solvents as nitro aliphatic compounds, for example nitro methane or nitro ethane. Nitrated aromatic compounds can be used although again they are not so satisfactory as the aliphatics apparently because of a tendency to alkylate. The temperature and pressure conditions for liquid phase operation are substantially the same as those given above and it is, of course, desirable to maintain the temperature by cooling. This may be done in various ways, but it is found easier to control the temperature of reaction in the liquid phase operation than with gas phase.

The liquid containing catalyst is removed either continuously or from time to time and the ethyl chloride produced may be distilled off by heat. The catalyst dissolved in the solvent remains undistilled and may be returned to the reaction chamber either continuously or from time to time. The catalyst has a longer life when used in this way but it will be understood that even under the best conditions very small amounts of polymers are apparently produced and the catalyst may be replaced from time to time. To illustrate the conditions of the present process, the following examples may be considered:

Example I

Gaseous hydrogen chloride and ethylene were mixed in a ratio of about two volumes of the former to three of the latter and passed at a temperature of 90 to 98° C. over a catalyst consisting of equi-molar portions of the anhydrous chlorides of zinc and iron. The catalyst was suspended on asbestos. Pressure was substantially atmospheric and the rate of flow of the gases was about 33.6 litres of the mixed inlet gas per 100 grams of catalyst per hour. The effluent gases were analyzed and the ethyl chloride produced was separated therefrom. The gas contained 13.1% hydrogen chloride, 41.6% ethylene and 45.3% ethyl chloride. This represented a conversion of 74% of the incoming hydrogen chloride and 53% of the incoming ethylene. No polymer whatever was observed over a period of one hour.

Example II

In a second experiment carried out but for a four hour period in the same manner as above with the same catalyst, temperature was maintained from 82 to 90° C., and the proportion of the reactants was 3 volumes of the hydrogen chloride to 4 volumes of ethylene. The rate of flow was 23.6 litres of the mixed initial gas per hour, per 100 grams of catalyst and the ethylene gas contained about 55% of ethyl chloride. No polymer was noted through the reaction. The conversion amounted to 62% based on the incoming ethylene and 82% based on the hydrogen chloride. There was a small amount of each of these unaccounted for.

Example III

In this experiment the catalyst consisted of equi-molar proportions of aluminum and ferric chloride dissolved in nitro methane. 9 parts by weight of the mixed chlorides were used per 100 parts by weight of the solvent. The gas was bubbled through this liquid while held at 71° C. The ratio of hydrogen chloride to ethylene was .63 and the rate of flow amounted to 142 litres of mixed gas per hour for 100 grams of the mixed chlorides. 99% of the incoming hydrogen chloride was converted to ethyl chloride while 61½% of the ethylene was thus converted. At the end of 4 hours the polymer amounted to only .85 gram per 100 grams of ethyl chloride obtained.

*Example IV*

In this experiment the conditions were quite similar to those of the previous example except that the ratio of reactants was .87 and the catalyst amounted to 11.9 parts by weight of the solid mixed chlorides dissolved in 100 parts of nitro methane, and the rate of flow was 93½ litres of mixed gas per hour per 100 grams of the mixed chlorides. The yield of ethyl chloride based on ethylene was 81%, on hydrogen chloride 93% and the amount of polymer formed was about .93 gram per 100 grams of ethyl chloride.

The present invention is not to be limited by any theory of the operation of the process nor by any particular catalyst or catalyst mixture, but only by the following claims in which it is desired to claim all novelty inherent in the process.

I claim:

1. In a process for producing alkyl halides by reaction of olefin with hydrogen halide, the improved step of employing a catalyst consisting essentially of a ferric halide and another halide selected from the class consisting of aluminum and zinc halides.

2. Process according to claim 1 in which the catalyst consists essentially of a mixture of ferric chloride and another halide selected from the class consisting of aluminum chloride and zinc chloride.

3. An improved process for producing alkyl chlorides without substantial production of polymer, comprising passing an olefin with hydrogen chloride over a catalyst consisting essentially of ferric chloride with another chloride selected from the group consisting of aluminum and zinc chlorides, at a reaction temperature at which considerable polymer is produced by either of the chlorides when used alone and recovering the alkyl chloride.

4. An improved process for producing ethyl chloride comprising a mixture of ethylene and hydrogen chloride over a catalyst consisting of equi-molar proportions of ferric chloride and another chloride selected from the group consisting of aluminum and zinc chlorides at an elevated reaction temperature at which such chlorides alone produce a substantial amount of polymer.

5. An improved process for producing alkyl halides comprising passing an olefin and halogen halide through a solution of a ferric halide and another halide selected from the group consisting of aluminum and zinc halides dissolved in an inert solvent and recovering the alkyl halide so produced.

6. Process according to claim 5 in which the catalyst consists essentially of a mixture of ferric chloride and a halide selected from the group consisting of aluminum and zinc chlorides.

7. An improved process for producing ethyl chloride without the substantial formation of polymer comprising passing a mixture of ethylene and hydrogen chloride through a liquid catalyst consisting essentially of ferric chloride and another chloride selected from the group consisting of aluminum and zinc chlorides dissolved in a substantially inert organic liquid, withdrawing the liquid, separating the ethyl chloride therefrom and returning the liquid catalyst for reuse.

8. Process according to claim 7 in which the catalyst consists essentially of equi-molar proportions of ferric chloride and a chloride selected from the group consisting of aluminum and zinc chlorides and the temperature is maintained from 20 to 150° C.

9. A process according to claim 1 in which the catalyst is supported on an inert carrier.

10. A process according to claim 3 in which the catalyst is supported on an inert carrier.

OBER C. SLOTTERBECK.